United States Patent [19]
Kubota

[11] 3,827,150
[45] Aug. 6, 1974

[54] DODGING COURSE CALCULATING DEVICE

[75] Inventor: Hiroshi Kubota, Takarazuka, Japan

[73] Assignee: Furuno Electric Company, Limited, Minamitakaki-gun, Nagasaki-ken, Japan

[22] Filed: Jan. 6, 1972

[21] Appl. No.: 215,871

[30] Foreign Application Priority Data
Jan. 21, 1971  Japan.............................. 46-26379

[52] U.S. Cl. .............................. 33/1 SD, 33/76 VA
[51] Int. Cl............................................ G01c 21/20
[58] Field of Search...................... 33/1 SD, 76 VA

[56] References Cited
UNITED STATES PATENTS

| | | | |
|---|---|---|---|
| 2,105,103 | 1/1938 | Sinitzin-White | 33/1 SD |
| 2,703,677 | 3/1955 | Harnwell | 33/76 VA |
| 2,834,110 | 5/1958 | Malakoff | 33/1 SD |
| 2,979,821 | 4/1961 | Tengwall | 33/1 SD |
| 2,991,555 | 7/1961 | Cambiaso | 33/1 SD |

FOREIGN PATENTS OR APPLICATIONS

| | | | |
|---|---|---|---|
| 593,114 | 10/1947 | Great Britain | 33/76 VA |

*Primary Examiner*—William D. Martin, Jr.

[57] ABSTRACT

A dodging course calculator having a pair of circular plates coaxially mounted for relative rotation with one plate having an azimuth scale and the other plate having a diametral line with means for providing a second line perpendicular to the diametral line and movable relative thereto.

1 Claim, 3 Drawing Figures

DODGING COURSE CALCULATING DEVICE

This invention relates to a dodging course calculating device for ships and more specifically to such a device which is convenient for use in cooperation with a radar device.

When a ship (hereinafter referred to as "subject ship") navigating on the sea has found another ship (hereinafter referred to as "object ship") displayed on its radar screen, it becomes necessary to calculate the positional relationship of both ships at a subsequent time to determine the course to be taken by the subject ship for preventing a collision if the closest distance between the ships when passing is presumed to be too small. While various methods have been proposed and used for the determination of a dodging course, they can generally involve either mathematical calculation or drawing construction. However, these methods require substantial mental calculation and considerable length of time. Should it be desired that the work be performed more quickly, an expensive electronic computer would be required.

Therefore, an object of this invention resides in the provision of a novel and improved device for easily determining the dodging course of the subject ship from the image of the object ship displayed on the radar screen of the subject ship.

The device according to this invention includes three flat circular scale boards arranged rotatably about a common central axis. The first board is an azimuth scale board having an azimuth scale on the periphery, the second scale board is a course scale board having an angle scale on the periphery for indicating the dodging course and the third scale board is a calculation scale board having an equisectional scale on a diameter and means for indicating a straight line orthogonally intersecting said graduated diameter.

The principle features and operation of the device of this invention will be best understood by reading the following description with reference to the accompanying drawings.

The principle of calculation of a dodging course for the subject ship will be described in detail with reference to FIG. 1 in order to facilitate an understanding of the structure and operation of the device of this invention.

Figure 1:
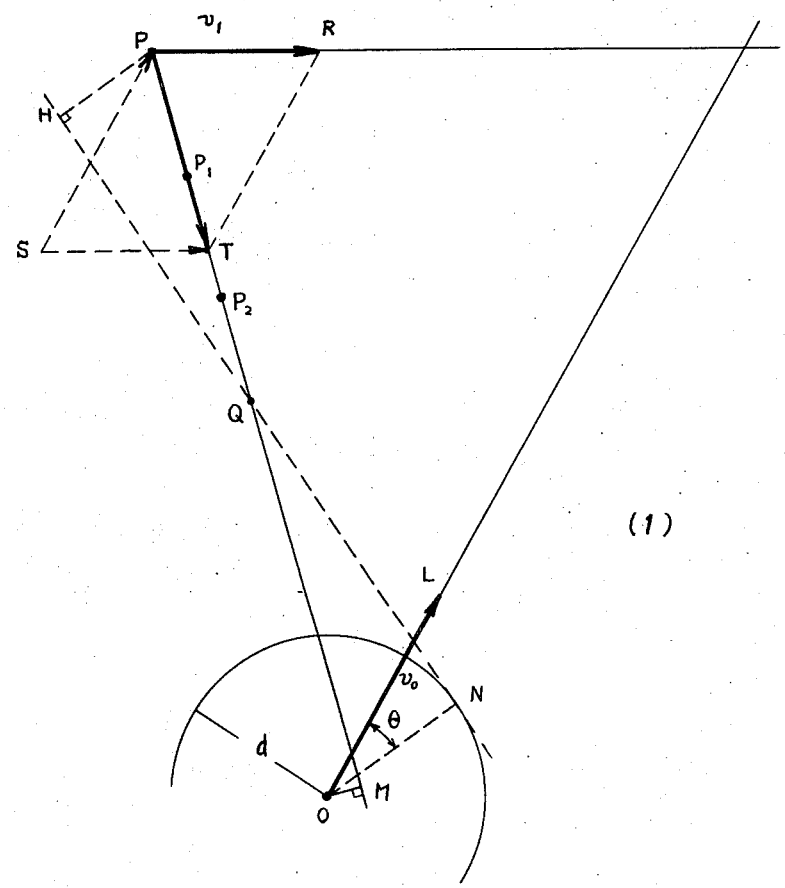
FIG. 1 is a diagram explaining the principle of this invention.
Figure 1:
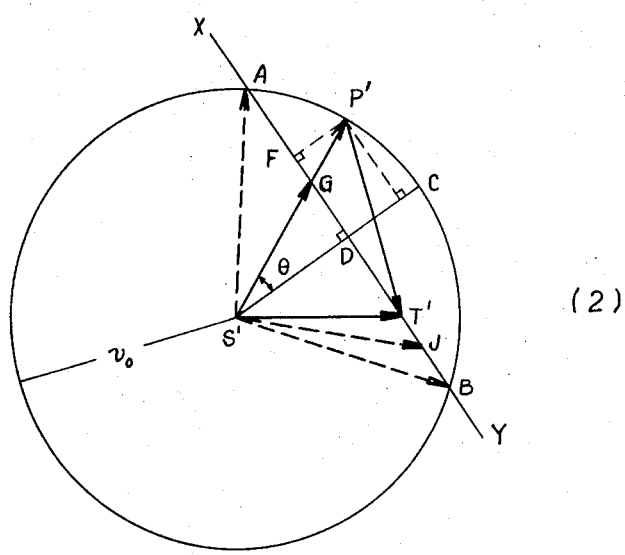

Referring to FIG. 1(1), assume that the subject ship is now at a position 0 and navigating at a speed $v_0$ in a direction $\overrightarrow{OL}$ and the object ship is at a position P and navigating at a speed $v_1$ in a direction $\overrightarrow{PR}$, where the lengths of the segments OL and PR indicate the magnitudes of speed $v_0$ and $v_1$ of both ships respectively. In this case, the position and bow direction of the subject ship are indicated on the radar screen by the center 0 of the screen and an arrow $\overrightarrow{OL}$, and the direction and speed of the object ship are indicated by an arrow $\overrightarrow{PT}$ which is one side of a velocity triangle PST, were SP is equal and parallel to $\overline{OL}$ and $\overline{ST}$ is equal and parallel to $\overline{PR}$.

The image of the object ship on the radar screen as it proceeds on its course moves in the direction $\overrightarrow{PT}$ is shown by $P_1$ and $P_2$. Therefore, a perpendicular OM drawn from the point 0 to the extension of $\overline{PT}$ corresponds to the closest distance between the ships at a future time. If the distance OM is less than a predetermined allowable distance, the distance must be increased to a suitable value $d$, and the subject ship must change its course at a suitable point of time. Assuming that the subject ship changes it course when the image of the object ship reaches a point Q selected appropriately on the extension of $\overline{PT}$, a sufficient distance will be obtained by changing the condition so that the image of the object ship moves along a line QN after it reaches the point Q, where the line QN is a tangent drawn from the point Q to a circle having its center at the point 0 and a radius equal to the value $d$.

In order to change the course of the image of the object ship from the point Q toward $\overrightarrow{QN}$, the course and/or speed of the subject ship must be changed so that the velocity vector (speed and direction) of the image of the object ship produces a new velocity triangle formed of a new velocity (vector) of the subject ship and the velocity $\overrightarrow{PR}$ of the object ship and, at the same time, it is directed to the direction $\overrightarrow{QN}$. The new velocity (vector) of the subject ship can be constructed as described below with reference to FIG. 1(2).

Transfer the velocity triangle PST of FIG. 1(1) in parallel relationship to P'S'T' of FIG. 1(2) and draw a circle having its center at 8' and passing the point P'. Draw a straight line XY parallel to the line QN of FIG. 1(1) and passing the point T', and mark the intersections of the straight line XY and the circle S' as A and B respectively. Then, AS'T' and BS'T' are the new velocity triangles and the sides $\overline{S'A}$ and $\overline{S'B}$ give the dodging courses of the subject ship when the speed of the subject ship is retained. Because in the new velocity triangles AS'T' and BS'T', the speed of the subject ship $= \overline{S'A} = \overline{S'B} = \overline{S'P'} = v_0$, the velocity of the object ship is S'T' and has not changed, and the new course XY of the object ship on the radar screen is parallel to the desired course QN.

Marking the intersection of the lines P'S' and XY as G, it is understood in accordance with the same interpretation that the length of $\overline{S'G}$ gives a speed of the subject ship to be taken when it maintains its original course. Further, drawing a straight line from the center S' to an arbitrary direction and marking the intersection with the straight line XY as J, it will be clear that the length of $\overline{S'J}$ gives a speed of the subject ship should its dodging course be changed to said arbitrary direction.

Now, drawing a radius S'C of the circle S' in FIG. 1(2) perpendicular to the straight line XY and marking the intersection of both as D, it is clear that the straight line XY is determined and, accordingly, the dodging course and speed of the subject ship are obtained if a ratio $\overline{S'D}/\overline{S'C}$ is given, because the direction of the straight line XY is easily obtained as shown in FIG. 1(1) and the radius of the circle S' is equal to the speed $v_0$ of the subject ship. This ratio can be obtained in accordance with the following consideration.

In FIG. 1(2), draw a perpencicular P'E from the point P' to the radius S'C and a perpendicular P'F from the same point P' to the straight line XY and defining the angle P'S'C $\theta$, then $\overline{S'D} = \overline{S'E} - \overline{DE} = \overline{S'P'} \cos\theta - \overline{P'F} = v_0 \cos\theta - \overline{P'F}$ Therefore $\overline{S'D}/\overline{S'C} = \overline{S'D}/v_0 = \cos\theta - \overline{P'F}/v_0 = K$ Assuming the time during which the image of the object ship moves from P to Q in FIG. 1(1) as $t$, and applying $t$ to the above equation, then $K = \cos\theta - \overline{P'F}\cdot t/v_0 t$ In the equation the value of ($\overline{P'F}\cdot t$) indicates the true distance PH in FIG. 1(1) which is a perpendicular drawn from the point P to the extension of the line QN because PHQ is similar to P'FT', $\overline{PH}$ corresponds to $\overline{P'F}$ and the valocity diagram of FIG. 1(2) multiplied by a time $t$ presents a true distance diagram. Therefore, putting $h_0$ as the true distance of PH, the value of K can be indicated as follows:

$$K = \cos\theta - h_0/v_0 t \qquad (1)$$

Since $\theta$ can be measured by the device of this invention as described hereinunder, $h_0$ can be measured on the radar screen, $t$ can be calculated from the movement of the image of the object ship on the radar screen and $v_0$ is known previously, the value K of the equation (1) can be calculated.

The above mentioned theory has been well known in the art and the dodging course has been obtained by constructing a drawing similar to that of FIG. 1(2) using the value K thus obtained, according to the prior art. This invention intends to provide a convenient device for obtaining the dodging course from the value K without constructing a drawing.

Figure 2:
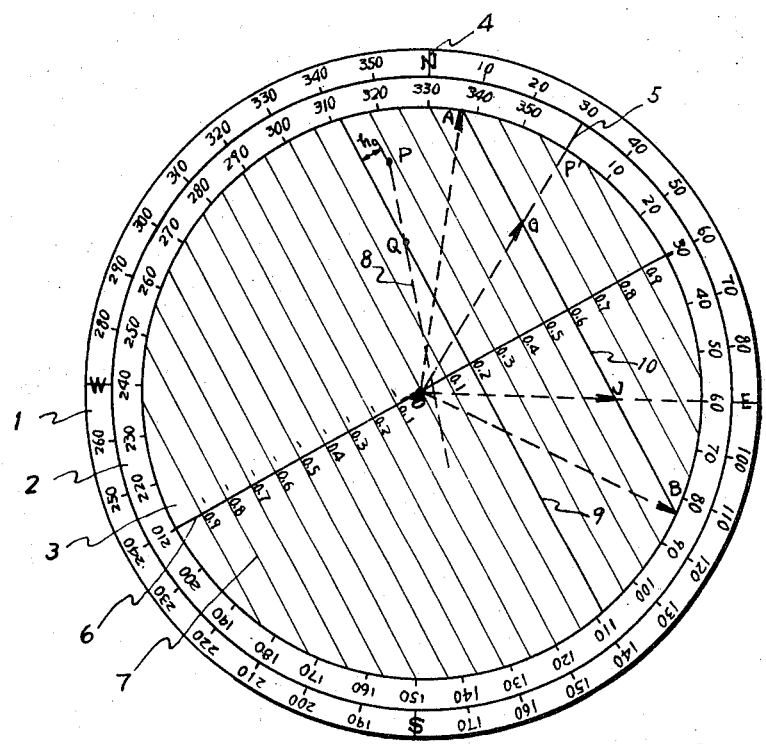
FIG. 2 is a plan view of an embodiment of the device according to this invention.

FIG. 2 represents an embodiment of a device according to this invention. The device includes three circular scale boards 1, 2 and 3 which are concentrically arranged so as to be rotatable individually about a common axis 0. The outermost scale board 1 is an azimuth scale board and has a 360° graduation beginning at a zero (north) mark and circulating clockwise around the periphery. This azimuth scale board 1 may be fixed to the radar screen, coinciding the center and direction. The intermediate scale board 2 is a course scale board and has also a 360° graduation beginning at a zero mark 5 and circulating clockwise around the periphery. The scale boards 1 and 2 may be made of overlying transparent circular plates or annular members slidably fitting with the outer peripheries of the inner scale boards.

The innermost scale board 3 is a calculation scale board and made of a transparent circular plate. The calculation scale board 3 has a diameter mark 6 having equisectional graduations on both sides of the center 0, those in one side having a plus sign and those in the other side having minus sign, and a plurality of parallel cursor lines 7 which intersect orthogonally the diameter 6 at every equisectional graduation thereof. In this example, the diameter is divided equally in ten and graduations 0, 0.1, 0.2 . . . . . 0.9 and −0.1, −0.2, . . . . . −0.9 are applied to the respective cursor lines 7. If the graduations are previously calibrated with respect to the true distance displayed on the radar screen, computations can be easily performed in the following manner.

In operation, the device is attached to a radar screen on which the object ship is imaged so that the center and azimuth of the azimuth scale board coincide with those of the radar screen, and the zero mark 5 of the course scale board 2 is aligned with the bow direction indication on the radar screen. The drawing shows that the subject ship is navigating in the direction of 30 degrees as an example. Then, the course of the object ship is presumed from the movement of its image with a lapse of time as shown by a dashed line 8 in FIG. 2, and a course changing point Q, at which the subject ship changes its course when the image of the object ship reaches said point, is determined arbitrarily on the line 8. One cursor line 9, the graduation of which corresponds to the above mentioned allowable closest distance $d$ (FIG. 1) is selected from the parallel cursor lines 7. (This cursor line 9 is shown relatively thicker in the drawing for convenience.) By rotating the scale board 3, the cursor line 9 is positioned to pass the point Q. It is apparent that the cursor line 9 in this position corresponds to the line QN in FIG. 1(1).

Next, the true distance from the point P to the cursor line 9, which corresponds to the true length of the perpendicular PH in FIG. 1 and the value $h_0$ in Equation (1), is read by using the cursor lines and their graduations calibrated with respect to the true distance. In this example, it is assumed to be 0.8 sea miles. An angle between the zero mark 5 indicating the bow direction of the subject ship and the diameter mark 6 apparently corresponds to the angle $\theta$ in FIG. 1 and Equation (1) and, in this example, it is read as 30°. Assuming the speed $v_0$ of the subject ship as 15 knots and the above mentioned time $t$ as 12 minutes, then the value of K is calculated as follows:

$$K = \cos 30° - \frac{0.8}{15 \times \frac{12}{60}} = 0.6$$

Then, selecting a cursor line 10 having a graduation of 0.6 (this cursor line is shown relatively thicker in the drawing) and marking the both ends of the cursor line 10 as A and B, it is apparent from the above mentioned principle that the triangle AOB in FIG. 2 is similar to the triangle AS'B in FIG. 1(2) and $\overline{OA}$ and $\overline{OB}$ give the dodging courses of the subject ship when the subject ship conserves its original speed $v_0$. In other words, in this example, these courses can be read directly from the graduations of the course scale board 2 and the subject ship may change its course by about 84° or 336°.

When the course of the subject ship is conversed, its speed must be reduced in accordance with a ratio $\overline{OG}/\overline{OP'}$ as shown in conjunction with the description of FIG. 1(2). As this ratio can be obtained conveniently by utilizing the graduations of the scale board 3, the wanted speed can also be obtained easily. A speed to be taken in the arbitrary dodging course $\overline{OJ}$ can be obtained similarly.

Figure 3:
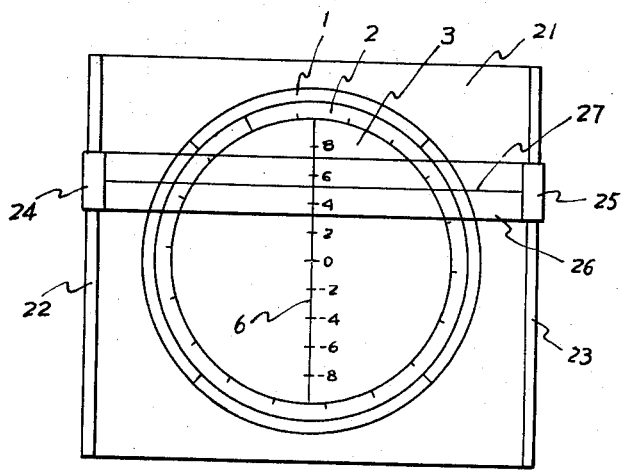
FIG. 3 is a plan view representing another embodiment of the device of this invention.

While an eye-measurement may be applied when the calculated value of K falls between two cursor lines, another embodiment which is useful in such a case is shown in FIG. 3.

The device of FIG. 3 includes three scale boards 1, 2 and 3 which are rotatably arranged similarly to those in FIG. 2. While the azimuth scale board 1 and the course scale board 2 have angular graduations similar to those of FIG. 2, the calculation scale board 3 has diameter 6 having equisectional graduations similar to those of FIG. 2 but has no parallel cursor line. The device further includes a base plate 21 and the calculation scale board 3 arranged in a fixed relationship to the base plate 21. The base plate 21 has a pair of parallel rails 22 and 23 which are also parallel to the diameter mark 6 of the calculation scale board 3. Sliding members 24 and 25 are respectively fit on the rails 22 and 23 and a transparent cursor plate 26 is fixedly supported therebetween. The cursor plate 26 has a cursor line 27 drawn perpendicular to the diameter mark 6 of the calculation scale board 3. Thus, the cursor plate 26 can be moved over the scale boards so that the cursor line 27 intersects the diameter mark 6 of the scale board 3 always orthogonally.

The method of operation of the device of FIG. 3 is almost similar to that described in conjunction with the device of FIG. 2. However, in place of the cursor lines 9 and 10 in FIG. 2, the cursor plate 26 is moved to meet the cursor line 27 with the diameter graduations concerned so that the cursor line 27 is put in positions corresponding to those of the cursor lines 9 and 10.

It should be noted that the above mentioned embodiments are presented only as an aid for explaining the invention and this invention is not limited thereto. For example, a string may be stretched between the sliding members 24 and 25 and moved so as to be always perpendicular to the diameter mark 6, instead of the cursor plate 26 of FIG. 3. Further, the cursor plate 26 of FIG. 3 may be combined with the calculation board 3 having the parallel cursor lines 7 of FIG. 2.

It should be noted, moreover, that, although the above mentioned embodiments are described as having three circular scale boards respectively, the device according to this invention can utilize only two scale boards, that is, a course scale board and a calculation scale board, if the only requirement is a course changing angle with respect to the present bow direction but not an absolute azimuthal direction. It is desirable that the two-scale board device be arrnaged to fit a radar screen so that the azimuth scale ring of the radar screen is used as the outermost azimuth scale board as heretofore described. It is of course evident that the device of this invention can be used separately from the radar screen.

As described in the above, according to this invention, the dodging course can be easily calculated by use of a very simple and inexpensive device.

What is claimed is:

1. A dodging course calculation device coordinated with a radar scope comprising a rectangular base plate having a central light transmitting portion, a first circular plate of transparent material rotatably carried centrally of said base plate and carrying an azimuth scale, a second rotatable circular plate of transparent material overlying the first plate and carrying a course scale, said second scale being concentrically positioned relative to the first scale, transparent means within the area of said second plate and carrying a diametral line intersecting the center of said circular plates and fixed relative to the base plate with said diametral line perpendicular to one pair of edges of said base plate, a pair of rails disposed along the other edges of said base plate and sliding members slidably engaging said rails and carrying a cursor line whereby movement of said sliding members will displace said cursor line relative to said diametral line while maintaining a perpendicular relationship therebetween, said diametral line having graduations representing scalar distances corresponding to the scale of said radar scope with the graduations from one side of said center increasing in a positive direction and the graduations from the other side of said center increasing in a negative direction.

* * * * *